(12) United States Patent
Scott

(10) Patent No.: US 7,832,812 B1
(45) Date of Patent: Nov. 16, 2010

(54) APPARATUS AND METHOD FOR SECURING A WHEEL TO A VEHICLE

(76) Inventor: John Frank Scott, 529 Jalna Rd., Birmingham, AL (US) 35214

( * ) Notice: Subject to any disclaimer, the term of this patent is extended or adjusted under 35 U.S.C. 154(b) by 49 days.

(21) Appl. No.: 12/331,385

(22) Filed: Dec. 9, 2008

(51) Int. Cl.
*B60B 27/00* (2006.01)
(52) U.S. Cl. .................................. 301/130; 301/111.04
(58) Field of Classification Search ............ 301/111.01, 301/111.03, 111.04, 130–132, 35.629
See application file for complete search history.

(56) References Cited

U.S. PATENT DOCUMENTS

| | | | |
|---|---|---|---|
| 357,828 A | 2/1887 | Hoepfner | |
| 1,372,813 A | 3/1921 | Helseth | |
| 1,379,558 A | 5/1921 | Haffner | |
| 1,395,921 A | 11/1921 | Lutsey | |
| 1,410,863 A | 3/1922 | Woodson | |
| 1,479,273 A | 1/1924 | Armstrong | |
| 1,480,223 A | 1/1924 | Robechaud | |
| 1,480,462 A | 1/1924 | Owen | |
| 1,521,934 A | 1/1925 | Eicher | |
| 1,566,261 A * | 12/1925 | La Delfa | ...................... 301/130 |
| 1,580,472 A | 4/1926 | Duemler | |
| 2,453,635 A | 11/1948 | Martin | |
| 3,000,673 A * | 9/1961 | Lansing | ...................... 301/128 |
| 3,915,504 A | 10/1975 | Bauer | |
| 4,828,328 A | 5/1989 | Bowman | |
| 5,269,593 A | 12/1993 | Wasson | |
| 6,626,502 B1 * | 9/2003 | Petrak | ................... 301/35.631 |
| 6,685,275 B2 * | 2/2004 | Gorges et al. | .......... 301/35.629 |
| 6,758,535 B2 * | 7/2004 | Smith | ......................... 301/128 |
| 7,108,336 B2 | 9/2006 | Dombroski | |
| 2006/0082215 A1 | 4/2006 | Dombroski | |

OTHER PUBLICATIONS

Bill Hughes. Photo of "Jeep Keeper" from "Another broken Jeep Dana 35c Rear End" available at www.billhughes.com/dana35c/jeepkeepers.com.jgp first visited on Feb. 27, 2008.
ANON. "Off Road Products" Low Range Magazine, Jan./Feb. 2007.

* cited by examiner

*Primary Examiner*—Jason R Bellinger
(74) *Attorney, Agent, or Firm*—Bradley Arant Boult Cummings, LLP

(57) ABSTRACT

An apparatus and method for securing a wheel to an axle that is particularly useful when the axle has fractured. The apparatus connects to the axle, for example at the axle flange, and also connects to the wheel hub assembly. A stabilizer contacts the axle conferring extra strength and stability to the apparatus, for example by extending inside of the hollow fractured axle. A reinforcement member can optionally be used to more firmly secure the apparatus to the axle. Methods for using the apparatus are also provided.

27 Claims, 4 Drawing Sheets

US 7,832,812 B1

APPARATUS AND METHOD FOR SECURING A WHEEL TO A VEHICLE

BACKGROUND

A. Field of the Disclosure

The field of the disclosure is automotive parts and repair.

B. Background of the Art

A fractured axle is a catastrophic failure in a wheeled vehicle. Upon fracturing, the axle will no longer support the weight of the vehicle. Typically the wheel will detach from the vehicle, and the portion of the vehicle that was supported by the wheel and the axle will fall until the chassis rests on the ground. The vehicle cannot be moved so long as the chassis rests on the ground. Attempts to do so will damage the chassis and be hindered by the enormous resistance posed by essentially dragging a portion of the vehicle's weight.

Several events can cause an axle to fracture. Inadequate lubrication of the axle of any wheeled vehicle can result in excessive wear leading to the axle failure. Off-road vehicles commonly operate on uneven ground which causes great stress to the axle; under such off-road conditions, even a well-maintained axle may fracture. Vehicles are often operated off-road in areas remote from service facilities and with poor communication infrastructure. Off-road vehicles are also operated during rescue missions and combat missions, in which it is not acceptable to wait for the vehicle to be towed to a service facility, and in which it is of dire importance that the mission continue despite mechanical failures. For these and other reasons, a means to effect a field repair of a fractured axle is desirable.

There is a long-felt but unmet need in the art for an adequate means to affix a wheel to a vehicle after the vehicle's axle has fractured. Previous solutions to this problem are insufficient in that they result in the newly affixed wheel frequently falling off the vehicle, requiring that the vehicle halt and the wheel be replaced on the vehicle. Thus there is a long-felt but unmet need in the art for a more lasting way to attach the wheel. Previous solutions also frequently require placement of some bracket or securing means on the outside of the vehicle to prevent (or merely delay) the wheel from falling off. Such brackets can damage the vehicle body and often snag objects in the vicinity of the vehicle. If the bracket is snagged, it may hinder the vehicle or pull off the bracket. Once the bracket is pulled off, the wheel falls off. Thus there is a long-felt but unmet need in the art for a way to attach the wheel to the vehicle that does not attach to the exterior of the vehicle.

SUMMARY

Disclosed is a superior and novel means for attaching a wheel to a vehicle that can be performed when an axle has fractured. An apparatus and method are provided for achieving the desired result. One of the objects of some embodiments of the method and apparatus is to allow the wheel to be attached quickly and easily under potentially adverse circumstances. Another object of some embodiments is to allow a standard wheel hub to be attached to the vehicle, such that no special hub or tire needs to be carried with the vehicle. Another object of some embodiments is to provide a strong, stable attachment that will be secure for long periods of time over rough terrain and at high speeds.

These and other objects are achieved by an apparatus comprising a hub assembly fastening point, an axle fastening point, and a stabilizer extending in a proximal direction. These and other objects are also achieved by a method comprising attaching the apparatus to a wheel hub assembly and attaching the apparatus to the axle.

DETAILED DESCRIPTION

Figure 1:
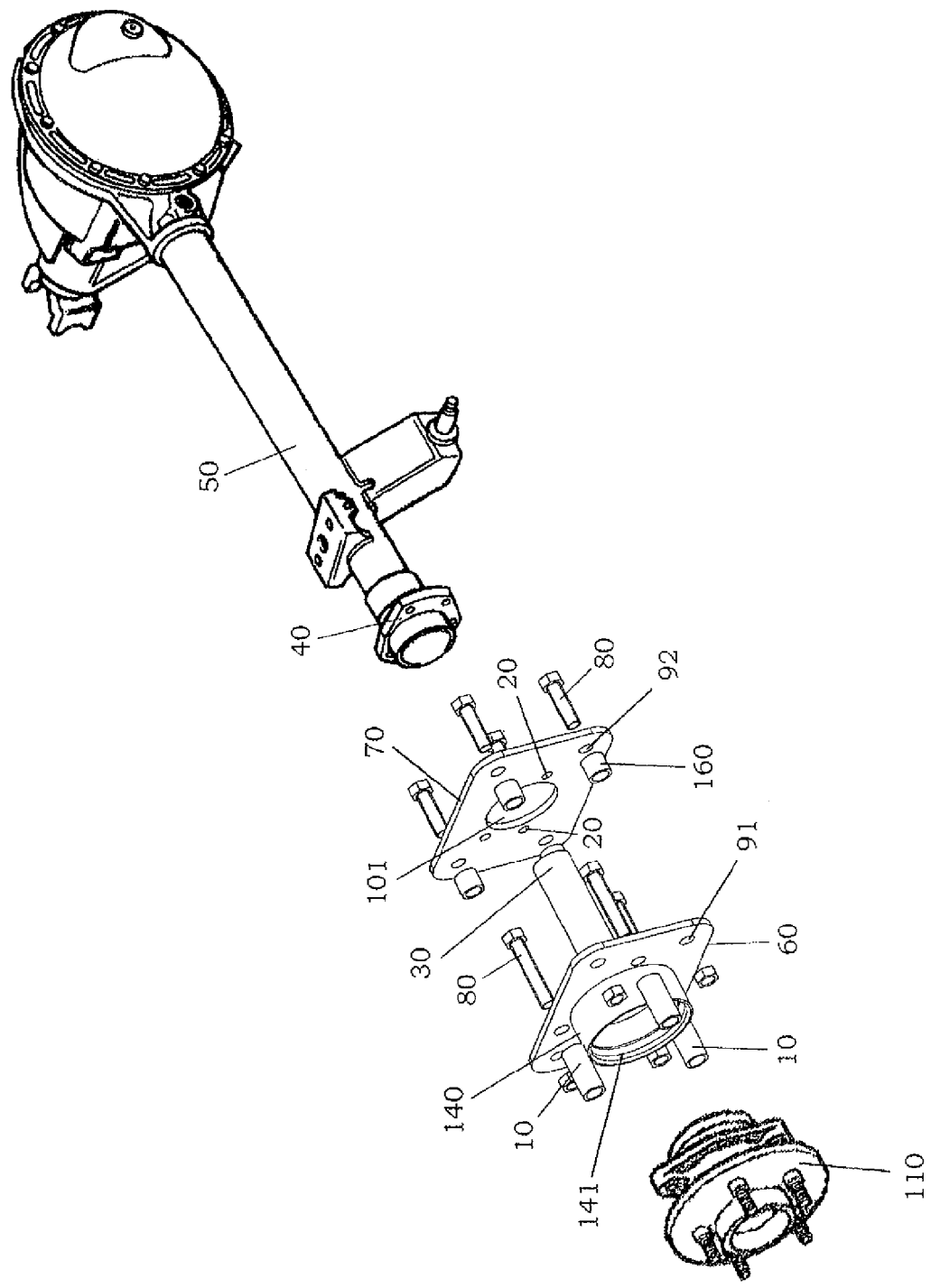
FIG. 1. A disassembled view of an embodiment of the apparatus, showing also a wheel hub assembly and axle with axle flange.
Figure 2:
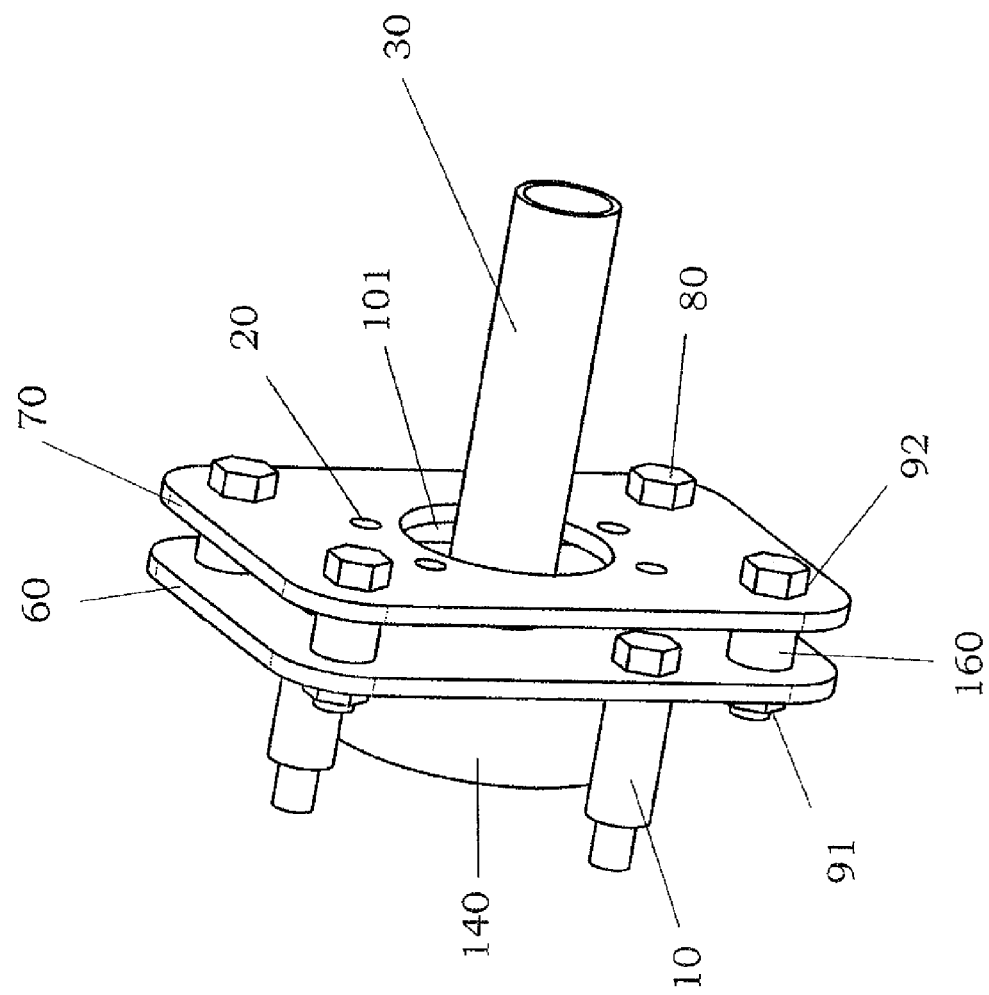
FIG. 2. An assembled view of the embodiment of the apparatus shown in FIG. 1.
Figure 3:
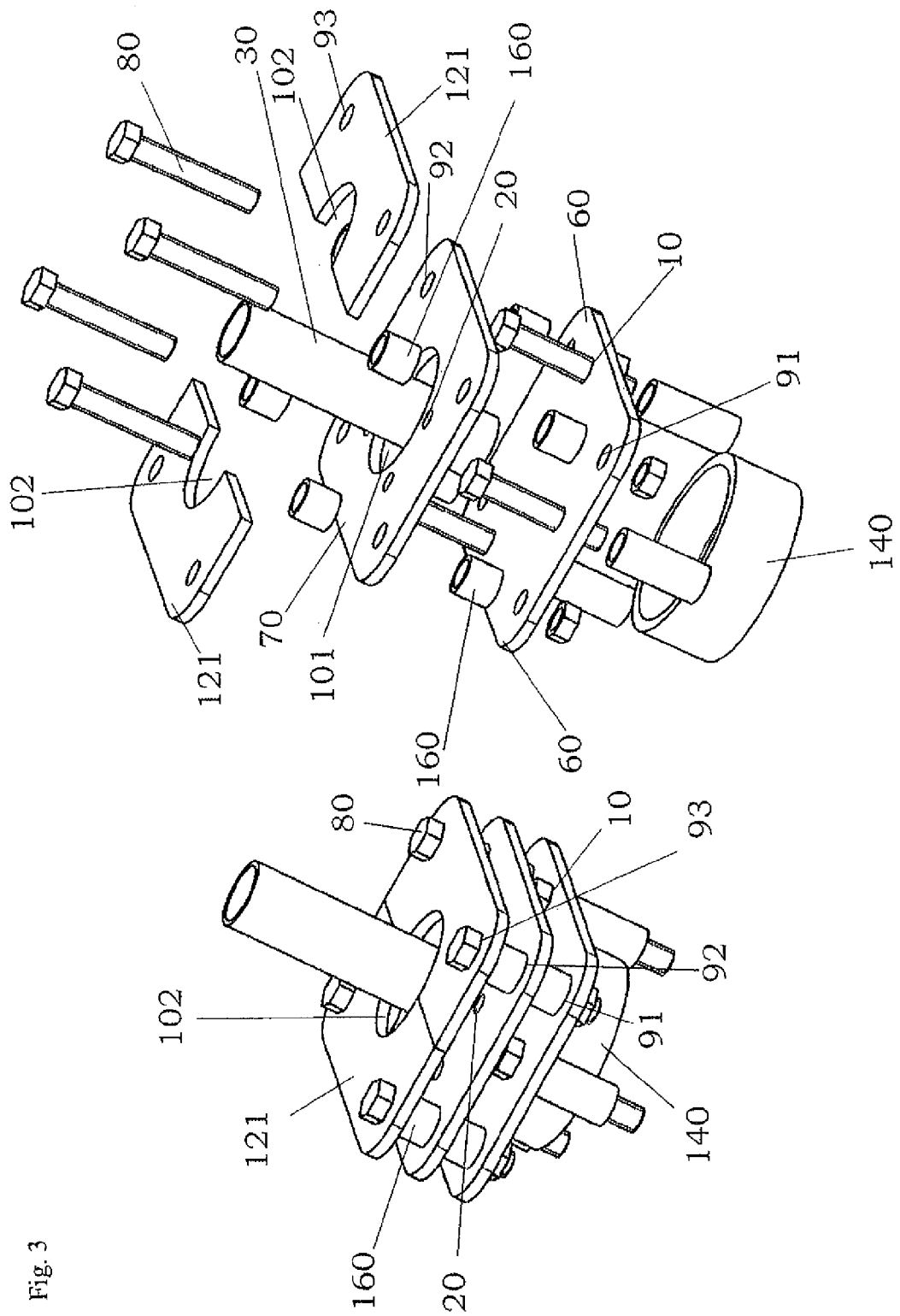
FIG. 3. A disassembled view of an embodiment of the apparatus comprising a reinforcement member.
Figure 4:
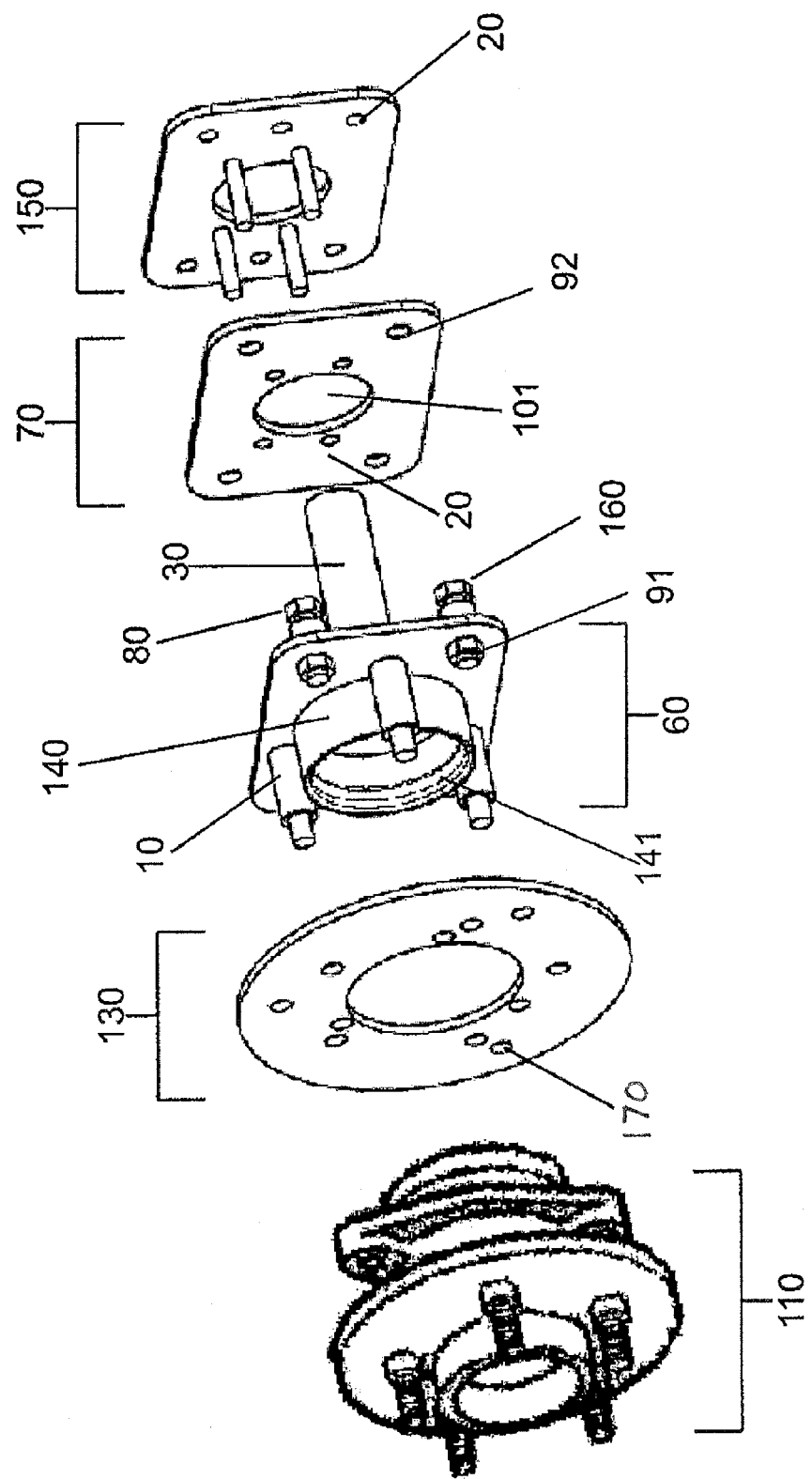
FIG. 4. A disassembled view of an embodiment of the apparatus comprising an axle adapter and a wheel hub assembly adapter.

All singular terms should be read to include the plural, and vice-versa, unless stated otherwise. Likewise, all masculine pronouns should be read to include the feminine, and vice versa, unless stated otherwise.

A. DEFINITIONS

The term "proximal" as used herein refers to a direction, the direction being from the outer portion of the vehicle to the inner portion of the vehicle.

The term "distal" as used herein refers to a direction that is the opposite of proximal.

The term "including" as used herein is non-exclusive, and should be read to mean "including but not limited to."

B. APPARATUS

The apparatus comprises a hub assembly fastening point 10, an axle fastening point 20, and a stabilizer 30 extending in a proximal direction. The hub assembly fastening point 10 may be fastened to a hub assembly by any means understood in the art, for example by a bolt, post, or screw. Bolts, posts, and screws have the advantage of being compatible with most standard hub assemblies. Alternatively the hub assembly may be fastened to the hub assembly fastening point 10 by more permanent means, such as soldering, welding, flashing, or the two components may be cast or forged together such that the wheel hub assembly 110 is an integral part of the apparatus. The hub assembly may be fastened to the hub assembly fastening point 10 by gluing, for example with metal glue or epoxy.

The axle fastening point 20 may be fastened to the axle by any means understood in the art, including those described above. For example, the axle fastening point 20 may be secured to an axle flange 40. Fastening to the axle flange 40 can be by any suitable method, for example by bolts that are often integral to the axle flange 40. The integral bolts have the advantage of being simple to attach and they are engineered to carry the vehicle's weight. Securing the apparatus to the axle flange 40 has the advantages of easy installation and enhanced structural strength.

The stabilizer 30 may serve to position the apparatus parallel to the fractured axle 50 and increase the load-bearing capacity of the apparatus. The stabilizer 30 may, for example, extend into the interior of the fractured axle 50. In some such embodiments the stabilizer 30 is cylindrical or rod-shaped, and allows the fractured axle 50 to rotate while the apparatus stays in place. In some embodiments the stabilizer 30 also serves to seal the fractured axle 50, preventing leakage of the axle lubricant from the fractured end. In some embodiments the stabilizer 30 sheaths the axle. In other embodiments the stabilizer 30 may contact the axle in any way known to those skilled in the art that is suitable to orient and support the apparatus.

Some embodiments of the apparatus comprise: a hub assembly attachment member 60 comprising the hub assembly fastening point 10 for securing the wheel hub assembly 110 to the apparatus; an axle attachment member 70 positioned proximally to the hub assembly attachment member 60 comprising the axle fastening point 20 for securing the apparatus to the axle; the stabilizer 30 connected to at least one of the hub assembly attachment member 60 and the axle flange 40 attachment member; wherein the hub assembly attachment member 60 and the axle attachment member 70 are secured to one another.

In some embodiments of the apparatus, the hub assembly attachment member 60 is a plate perpendicular to the axle. The plate comprises one or more hub assembly attachment points. In some embodiments, there are three hub assembly attachment points. In other embodiments, there may be four, five, six, seven, eight, or more hub assembly attachment points. There may be any number of hub assembly attachment points, corresponding to the number of bolt-holes, post-holes, or threaded holes present on the proximal side of the hub assembly for the particular vehicle. In some embodiments, there are fewer hub assembly attachment points than there are bolt-holes or threaded holes present on the proximal side of the hub assembly of the vehicle. For vehicles in which the hub assembly employs another means of attachment to the axle, the hub assembly attachment point may be any compatible fastener.

In some embodiments of the apparatus, the hub assembly attachment member 60 and the axle attachment member 70 are secured to one another by a fastening element 80. The fastening element 80 may be any appropriate means of fastening known to those skilled in the art, for example a bolt, post, or screw. The fastening element 80 should be sufficiently strong to withstand the load of the vehicle and the shock of normal driving. Optionally the fastening element 80 will be sufficiently strong to withstand the shock of off-road driving or driving at highway speeds.

In some embodiments of the apparatus the hub assembly attachment member 60 further comprises a first inter-member fastening point 91 for receiving the fastening element 80 and the axle attachment member 70 further comprises a second inter-member fastening point 92 for receiving the fastening element 80. The inter-member fastening points serve to connect the hub assembly attachment member 60 to at least one of the axle attachment member 70 and a reinforcement member. There may be any number of first and second inter-member fastening points 92. Having fewer inter-member fastening points has the advantage of ease of installation. Having more numerous inter-member fastening points has the advantage of strength and redundancy. Certain embodiments of the apparatus comprise 1, 2, 3, 4, 5, 6, 7, 8, 9, 10, and more than 10 first inter-member fastening points 91 and further comprise 2, 3, 4, 5, 6, 7, 8, 9, 10, and more than 10 second inter-member fastening points 92.

In some embodiments of the apparatus, the axle fastening point 20 is configured to secure the apparatus to an axle flange 40. Such configuration can take the form of hole or guide for a fastener, such as a bolt, post, or screw. The fastening point may be configured to accept the bolts that are integral to the axle flange 40 (in which case the fastening point would be a hole of appropriate diameter). If the fastening point is configured to accept the bolts that are integral to the axle flange 40, it has the advantage of ease of installation, reversibility of attachment, and durability. The fastening points may also be bolts that are integral to the apparatus, for example if the axle flange 40 comprises holes for accepting bolts. The fastening points may also be bolt-holes, post-holes, or screw-holes for accepting such fasteners that may also be attached to the axle flange 40. In some embodiments the fastening points will be configured identically to the means used for fastening the brake housing to the axle flange 40 for a particular model (or models) of vehicle.

Any number of axle fastening points 20 may be present. If the axle fastening point 20 is configured to secure the apparatus to an axle flange 40, the number of axle fastening points 20 will often depend on the configuration of the axle flange 40. Having fewer axle fastening points 20 has the advantage of ease of installation. Having more numerous axle fastening points 20 has the advantage of strength and redundancy. Certain embodiments of the apparatus comprise 1, 2, 3, 4, 5, 6, 7, 8, 9, 10, and more than 10 axle fastening points 20.

In some embodiments of the apparatus, the hub assembly fastening point 10 is configured to secure the wheel hub assembly 110 to the apparatus in a reversible manner. In some embodiments of the apparatus, the axle fastening point 20 is configured to reversibly secure the axle to the apparatus. Such embodiments have the advantages of allowing re-use of the apparatus, not requiring that the apparatus be irreversibly mated to a wheel hub assembly 110 or axle, and ease of removal once the apparatus is no longer needed. Reversible securing can be achieved by any suitable means understood in the art.

Some embodiments of the apparatus further comprise an axle flange 40 secured to the axle fastening point 20. In such embodiments the apparatus is at least partially installed to the vehicle.

In some embodiments of the apparatus the stabilizer 30 is connected to the hub assembly attachment member 60 and the axle attachment member 70 further comprises a first opening 101 to receive the stabilizer 30. When installed, the stabilizer 30 passes through the first opening 101 to contact the axle. In some embodiments the stabilizer 30 is connected to the hub assembly attachment member 60 via welding or flashing. In other embodiments the stabilizer 30 is connected to the hub assembly attachment member 60 by a glue or a fastener. In other embodiments the stabilizer 30 is connected to the hub assembly attachment member 60 during manufacturing (for example, as a single workpiece).

Some embodiments further comprise the wheel hub assembly 110 secured to the hub assembly fastening point 10. The apparatus may be stored with the wheel hub assembly 110 secured to the hub assembly fastening point 10; this has the advantage of saving installation time when it becomes necessary to attach the wheel to the vehicle. In some embodiments, the hub assembly attachment member 60 is secured to the hub assembly prior to full installation of the apparatus; in such embodiments, the axle attachment member 70 may be attached to the hub assembly attachment member 60, or it may remain unattached until installation.

Some embodiments of the apparatus further comprise a reinforcement member, wherein the reinforcement member is secured to the hub assembly attachment member 60 and the axle attachment member 70. In certain of these embodiments, the reinforcement member is positioned proximally to the axle attachment member 70 and the reinforcement member further comprises a second opening 102 to receive at least one of the stabilizer 30 and the axle. The reinforcement member may be positioned proximally to the axle flange 40, such that the axle flange 40 is clamped between the reinforcement member and the axle attachment member 70. If the reinforcement member is positioned proximally to the axle flange 40, the reinforcement member may comprise a second opening 102 to accept at least one of the stabilizer 30 or the axle. The second opening 102 may take the form of a gap between two or more discontinuous sub-members 121 of the reinforcement member. Alternatively, the second opening 102 may be a groove or slot in the reinforcement member or any portion thereof that allows the reinforcement member to be installed around the axle. In one embodiment, the reinforcement member comprises two sub-members 121, the sub-members 121 being rectangular plates having a semicircular area cut out of a side; then the sub-members 121 are assembled on either side of the axle, and they form a circular cutout that accommodates the axle. This has the advantage of allowing the reinforcement member to be attached proximally to the axle flange 40 without interfering with the rotation of the axle.

In some embodiments of the apparatus, the reinforcement member is secured to the hub assembly attachment member 60 and the axle attachment member 70 by a fastening element 80. The fastening element 80 can be any fastening element 80 described in this disclosure.

In some embodiments of the apparatus, the hub assembly attachment member 60 further comprises a first inter-member fastening point 91 for receiving the fastening element 80, the axle attachment member 70 further comprises a second inter-member fastening point 92 for receiving the fastening element 80, and the reinforcement member further comprises a third inter-member fastening point 93 for receiving the fastening element 80. The fastening element 80 can be any fastening element 80 described in this disclosure.

In some embodiments of the apparatus, the fastening element 80 is a bolt or a screw.

In some embodiments of the apparatus, the hub assembly attachment member 60 further comprises a hub adapter 130 secured to the hub assembly fastening point 10, the hub adapter 130 comprising a second hub assembly fastening point 170 for securing a hub assembly to the apparatus. The use of a hub adapter 130 has the advantage of allowing the hub assembly attachment member 60 to be attached to plurality of configurations of hub assembly. The hub adapter 130 may take many forms. For example, the hub adapter 130 may comprise a fastening point compatible with the first hub assembly fastening point 10, and the second hub assembly fastening point 170 may be compatible with one or more models of hub assembly. Either attachment point may be adjustable. One or more hub adapters 130 may be kept with the apparatus, so that the apparatus may be used with more than one type of hub assembly as needed. In such embodiments, the hub adapter 130 may be removably secured to the hub assembly attachment member 60.

Some embodiments of the apparatus further comprise a wheel hub assembly 110 secured to the second hub assembly attachment point. The wheel hub assembly 110 and the second hub assembly point (and thus the hub adapter 130) may be stored secured to one another for quick deployment when needed. Alternatively, the wheel hub assembly 110 and the second hub assembly point may be secured to one another at the time of repair.

In some embodiments of the apparatus, the hub assembly attachment member 60 comprises a hub assembly socket 140 facing distally. The hub assembly socket 140 may have interior contours 141 that allow the hub assembly to sit snugly within the socket, preventing leakage of lubricant and allowing the hub assembly to be firmly secured to the apparatus. The contours may be beveling, for example. The interior contours 141 may assume any shape. In some embodiments, the interior contours 141 match a given model of hub assembly. The model of hub assembly may be any model.

In some embodiments of the method, the axle attachment member 70 further comprises an axle adapter 150 secured to the axle fastening point 20, the axle adapter 150 comprising a second axle fastening point 180 for securing the apparatus to the axle. The use of an axle adapter 150 has the advantage of allowing the axle attachment member 70 to be attached to plurality of configurations of axles. The axle adapter 150 may take many forms. For example, the axle adapter 150 may comprise a fastening point compatible with the first axle fastening point 20, and the second axle fastening point 180 may be compatible with one or more models of axle. Either attachment point may be adjustable. One or more axle adapters 150 may be kept with the apparatus, so that the apparatus may be used with more than one type of axle as needed. In such embodiments, the axle adapter 150 may be reversibly secured to the axle attachment members 70.

Some embodiments of the apparatus comprise: a hub assembly attachment member 60 comprising (1) a hub assembly socket 140 facing distally, (2) a hub assembly fastening point 10, and (3) a stabilizer 30 extending proximally; an axle flange 40 attachment member positioned proximally to the hub assembly attachment member 60, comprising (a) a first opening 101 to accept the stabilizer 30, and (b) an axle flange 40 fastening point; a reinforcement member, the reinforcement member comprising a second opening 102 to accept at least one of the stabilizer 30 or the axle; and an inter-member fastener connecting the hub assembly attachment member 60, the axle flange 40 attachment member, and the reinforcement member.

The apparatus may comprise spacers 160 between various parts. Some embodiments of the method further comprise at least one of (1) a first spacer positioned between the hub assembly attachment member 60 and the axle flange 40 attachment member and (2) a second spacer positioned between the axle flange 40 attachment member and the reinforcement member.

C. METHODS

The disclosure provides methods for securing a wheel to a vehicle. These methods comprise securing an axle fastening point 20 of an apparatus disclosed herein to the axle; and securing the hub assembly fastening point 10 to the hub assembly. In some embodiments, these methods comprise securing any apparatus described herein to an axle flange 40 and securing the apparatus to a wheel hub assembly 110.

Some embodiments of the method further comprise securing the axle attachment member 70 to an axle adapter 150, said axle adapter 150 comprising an axle attachment member 70 fastening point and a second axle fastening point 180. Such embodiments may comprise fastening the second axle fastening point 180 to an axle flange 40.

Some embodiments of the method comprise removing a brake assembly from the axle; fastening a hub assembly attachment member 60 to a wheel hub assembly 110; fastening an axle flange 40 attachment member to the axle flange 40; inserting a stabilizer 30 into the axle, wherein the stabilizer 30 extends in a proximal direction and is connected to at least one of the hub assembly attachment member 60 and the axle flange 40 attachment member; and securing the hub assembly attachment member 60 to the axle flange 40 attachment member. The method may further comprise positioning a reinforcing member proximal to the axle flange 40; and securing the reinforcing member to at least one of the hub assembly attachment member 60 and the axle flange 40 attachment member.

D. EXAMPLE

In one illustrative example, the apparatus is configured to be used with Jeep models manufactured and sold by Dana Corp. These models include the Jeep Cherokee XJ (1990-2000 model years), Jeep Wrangler YJ (1990-1996), Jeep Grand Cherokee ZJ (1993-2006), and Jeep Wrangler TJ (1997-2006). These models were sold with the "C" clip axle.

The apparatus of the example comprises an axle flange 40 attachment member, and the axle flange 40 attachment member comprises four axle flange 40 fastening points arranged in a trapezoid. The trapezoid-configured axle flange 40 fastening points correspond to the four posts on the axle flange 40, allowing easy attachment without additional fasteners. The axle flange 40 attachment member further comprises a first opening 101 to accept the stabilizer 30.

The apparatus of the example further comprises a hub assembly attachment member 60 comprising a hub assembly socket 140 facing distally, a hub assembly fastening point 10, and a stabilizer 30 extending proximally. The hub assembly socket 140 contains interior beveling allowing a wheel hub assembly 110 from the particular models to form a tight seal in the socket. There are three hub assembly attachment points, corresponding in configuration to the three screw holes on the proximal side of the hub assemblies of the particular models. Thus, bolts or screws can be used to quickly and easy attach the hub assembly to the hub assembly attachment points.

The stabilizer 30 is a hollow cylinder that fits inside the axle. The cylinder is sufficiently wide to contact the gasket inside the axle to create a seal against the leakage of axle lubricant.

The hub assembly attachment member 60 and the axle flange 40 attachment member are bolted together using four bolts, although the number of bolts is not critical. Each of the bolts passes through a spacer between the two members, so that the two members are held firmly a small distance apart. Each of the four bolts is secured with a nut.

Optionally a reinforcement member may be used. The reinforcement member consists of two rectangular plates from which a semicircular area has been removed. Each plate contains two attachment points corresponding to the positions of the four bolts that attach the hub assembly attachment member 60 to the axle flange 40 attachment member. The plates are placed on either side of the axle proximal to the axle flange 40, and the reinforcement member is then bolted to the axle flange 40 attachment member and the hub assembly attachment member 60. The bolts pass through four additional spacers 160 between the axle flange 40 attachment member and the reinforcement member.

The apparatus of the example is deployed by removing the brake housing from the axle flange 40, sliding the axle flange 40 attachment member over the posts of the axle flange 40, screwing or bolting the wheel hub assembly 110 attachment member 60 to the wheel hub assembly 110, optionally positioning the reinforcement member around the axle, and bolting together the hub assembly attachment member 60, the axle flange 40 attachment member, and optionally the reinforcement member.

E. CONCLUSIONS

The foregoing description illustrates and describes the methods, apparatuses and other teachings of the present disclosure. Additionally, the disclosure shows and describes only certain embodiments of the methods, apparatuses and other teachings disclosed, but it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the methods, apparatuses and other teachings of the present disclosure and to enable others skilled in the art to utilize the teachings of the present disclosure in such, or other, embodiments and with the various modifications required by the particular applications or uses. Accordingly, the methods, apparatuses and other teachings of the present disclosure are not intended to limit the exact embodiments and examples disclosed herein.

I claim:

1. An apparatus comprising:
   (a) a hub assembly attachment member having a hub assembly fastening point for securing a wheel hub assembly to the apparatus;
   (b) an axle attachment member positioned proximally to the hub assembly attachment member comprising an axle fastening point for securing the apparatus to the axle;
   (c) a stabilizer connected to the hub assembly attachment member, wherein the stabilizer is connected to the hub assembly attachment member and the axle attachment member further comprises a first opening to receive the stabilizer;
   (d) wherein the hub assembly attachment member and the axle attachment member are secured to one another.

2. The apparatus of claim 1 where the hub assembly attachment member and the axle attachment member are secured to one another by a fastening element.

3. The apparatus of claim 2, wherein the hub assembly attachment member further comprises a first inter-member fastening point for receiving the fastening element and the axle attachment member further comprises a second inter-member fastening point for receiving the fastening element.

4. The apparatus of claim 1, wherein the axle fastening point is configured to secure the apparatus to an axle flange.

5. The apparatus of claim 1, wherein the hub assembly fastening point is configured to removably secure the wheel hub assembly to the apparatus.

6. The apparatus of claim 1, wherein the axle fastening point is configured to removably secure the axle to the apparatus.

7. The apparatus of claim 4, further comprising the axle flange secured to the axle fastening point.

8. The apparatus of claim 1, further comprising the wheel hub assembly secured to the hub assembly fastening point.

9. The apparatus of claim 1, further comprising a reinforcement member, wherein the reinforcement member is secured to the hub assembly attachment member and the axle attachment member.

10. The apparatus of claim 9, wherein the reinforcement member is positioned proximally to the axle attachment member and the reinforcement member further comprises a second opening to receive at least one of the stabilizer and the axle.

11. The apparatus of claim 9, wherein the reinforcement member is secured to the hub assembly attachment member and the axle attachment member by a fastening element.

12. The apparatus of claim 11, wherein the hub assembly attachment member further comprises a first inter-member fastening point for receiving the fastening element, the axle attachment member further comprises a second inter-member fastening point for receiving the fastening element and the reinforcement member further comprises a third inter-member fastening point for receiving the fastening element.

13. The apparatus of any one of claim 2, 3 or 11 wherein the fastening element is a bolt, a post, or a screw.

14. The apparatus of claim 1, wherein the hub assembly attachment member further comprises a hub adapter secured to the hub assembly fastening point, the hub adapter comprising a second hub assembly fastening point for securing a hub assembly to the apparatus.

15. The apparatus of claim 14, further comprising a wheel hub assembly secured to the second hub assembly attachment point.

16. The apparatus of claim 1, wherein the hub assembly attachment member comprises a hub assembly socket facing distally.

17. The apparatus of claim 1, wherein the axle attachment member further comprises an axle adapter secured to the axle fastening point, the axle adapter comprising a second axle fastening point for securing the apparatus to the axle.

18. An apparatus for securing a wheel hub assembly to a fractured axle, comprising:
 (a) a hub assembly attachment member comprising
  i. a hub assembly socket facing distally,
  ii. a hub assembly fastening point, and
  iii. a stabilizer extending proximally;
 (b) an axle flange attachment member positioned proximally to the hub assembly attachment member, comprising
  i. a first opening to accept the stabilizer, and
  ii. an axle flange fastening point;
 (c) a reinforcement member, the reinforcement member comprising a second opening to accept at least one of the stabilizer or the axle; and
 (d) an inter-member fastener connecting the hub assembly attachment member, the axle flange attachment member, and the reinforcement member.

19. The apparatus of claim 18 further comprising at least one of (i) a first spacer positioned between the hub assembly attachment member and the axle flange attachment member and (ii) a second spacer positioned between the axle flange attachment member and the reinforcement member.

20. A method of securing a wheel to an axle comprising:
 (a) securing the apparatus of claim 1 to an axle; and
 (b) securing the apparatus of claim 1 to a wheel hub assembly.

21. The method of claim 20, comprising securing the apparatus to an axle flange.

22. The method of claim 20, comprising:
 (a) securing the axle fastening point to the axle; and
 (b) securing the hub assembly fastening point to the hub assembly.

23. The method of claim 20, comprising securing the axle attachment member to an axle adapter, said axle adapter comprising an axle attachment member fastening point and a second axle fastening point.

24. The method of claim 23, comprising fastening the second flange fastening point to an axle flange.

25. A method of securing a wheel to an axle comprising:
 (a) securing the apparatus of claim 18 to an axle flange; and
 (b) securing the apparatus of claim 18 to a wheel hub assembly.

26. A method of securing a wheel to an axle comprising:
 (a) removing a brake assembly from the axle;
 (b) fastening a hub assembly attachment member to a wheel hub assembly;
 (c) fastening an axle flange attachment member to the axle flange;
 (d) inserting a stabilizer into the axle, wherein the stabilizer extends in a proximal direction and is connected to the hub assembly attachment member; and
 (e) securing the hub assembly attachment member to the axle flange attachment member.

27. The method of claim 26, comprising:
 (a) positioning a reinforcing member proximal to the axle flange; and
 (b) securing the reinforcing member to the hub assembly attachment member.

* * * * *